Dec. 26, 1972   R. F. HANLEY   3,707,359
COMPOSITE THERMOSTATIC METAL LAMINATE
Filed Nov. 17, 1970

INVENTOR.
BY *Robert F. Hanley*
Gerald B. Epstein Att'y.

1

3,707,359
COMPOSITE THERMOSTATIC METAL LAMINATE
Robert F. Hanley, Pawtucket, R.I., assignor to Texas
Instruments Incorporated, Dallas, Tex.
Filed Nov. 17, 1970, Ser. No. 90,323
Int. Cl. B32b 15/00
U.S. Cl. 29—195.5                                                                 11 Claims

ABSTRACT OF THE DISCLOSURE

A composite metal laminate material is disclosed which is particularly adapted for use as a thermostatic material. The composite metal laminate includes first and second outer layers each of preselected materials having substantially different coefficients of thermal expansion and an interliner material disposed intermediate the first and second outer layers and metallurgically bonded to one of the layers. In addition, a diffusion layer is defined metallurgically bonded to the interliner and to the other of the outer layers and defines the interface between the interliner and the other of the outer layers.

Figure 1:
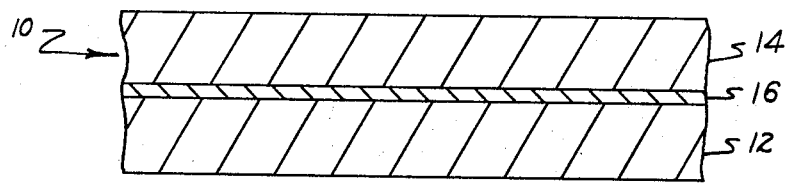

In various applications, it is necessary to form metallic laminates including several layers of metallic material bonded together in order to provide a composite structure having desired properties which may be unobtainable or difficult to obtain utilizing a single material. In such instances, it may be desirable to bond several materials having relatively dissimilar characteristics in order to provide a composite material having the requisite characteristics. For example, in the fabrication of thermostatic material, it is often required to bond together quite dissimilar materials having significantly different coefficients of thermal expansion in order to obtain a composite material susceptible to a flexing or bending type movement in response to temperature changes. It is well known that certain difficulties may be encountered in attempting to bond together various metallic materials which do not have a bonding affinity with each other and such problems may be compounded in attempting to bond together such metallic materials which have substantially dissimilar characteristics, such as significantly different coefficients of thermal expansion. Furthermore, a bond failure may be quite disastrous in certain instances, such as in the fabrication of a composite thermostatic metal laminate, since the composite material may be required to serve a critical temperature sensing function which could be totally defeated as a result of a bond failure.

Although various approaches have been utilized in the fabrication of metallic laminates having several layers of dissimilar materials, certain difficulties still remain. Among the various bonding techniques which have been utilized are mechanical attachment utilizing rivets, the use of adhesive materials, plating and alloying, etc. However, substantial difficulties may be still encountered in the fabrication of a composite laminate in which a good bond is provided, when dissimilar materials are to be joined and do not have a bonding affinity with respect to each other. For example, the use of mechanical bonding means such as riveting or adhesives often does not result in a good bond due to surface irregularities in the materials. Similarly, chemical means such as chemical cleaning and plating in certain instances may be prohibitively expensive and not provide a sufficiently strong bond, while alloying procedures may produce excessive heat which adversely affects the materials or prevents bonding between materials having dissimilar characteristics. Furthermore, in certain instances, materials which are to be bonded together but which do not have a bonding affinity with respect to each other are susceptible to problems of unwanted diffusion of atoms at the interface between the materials which may be detrimental to a good bond.

Accordingly, it is an object of the present invention to provide an improved composite metal laminate.

It is another object of the present invention to provide an improved composite metal laminate including a plurality of layers of metallic material in which a good bond is provided between the layers of material.

It is still another object of the present invention to provide an improved composite thermostatic metal laminate in which a plurality of layers of metallic material having substantially different thermal characteristics are bonded to each other.

Figure 2:
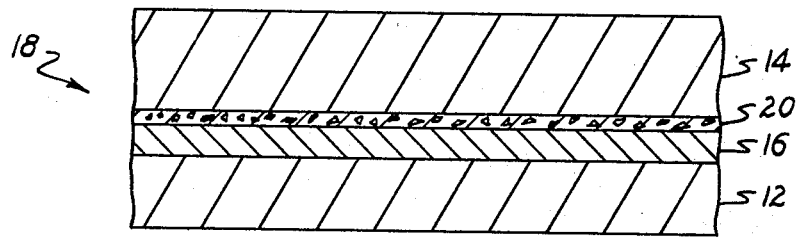

Various additional objects and advantages of the present invention will become readily apparent from the following detailed description and accompanying drawings wherein:

FIG. 1 is a vertical sectional view of a metal laminate material in accordance with the present invention at an intermediate stage of fabrication; and FIG. 2 is a vertical sectional view of the composite metal laminate material of FIG. 1 at an advanced stage of fabrication.

Referring generally to the drawings and initially to FIG. 1, a laminate material in accordance with the present invention at a preliminary stage of fabrication is indicated generally by the reference numeral 10. The material includes a first outer layer 12 of a first preselected metallic material and a second outer metallic layer 14 of a second preselected metallic material each of the outer layers 12 and 14 preferably having a substantially different coefficient of thermal expansion with respect to each other. As shown, the first and second outer layers 12 and 14 define the opposed outer surfaces of the laminate 10. In addition, a metallic interliner material 16, comprising a third preselected metallic material, is disposed intermediate the first and second outer layers 12 and 14 in order to provide a metallurgical bond therebetween, as will be subsequently explained in detail.

Referring to FIG. 2, the composite metal laminate of FIG. 1 is illustrated at an advanced stage of fabrication and is indicated generally by the reference numeral 18. As shown, the composite metal laminate 18 also includes the first and second outer layers 12 and 14 respectively, as well as the interliner material 16, but further includes a diffusion layer 20 intermediate the interliner 16 and the second outer layer 14. The diffusion layer 20 is formed such that it occupies a preselected portion of the volume of the second outer layer 14, and defines the interface between the second outer layer 14 and the interliner 16, and is metallurgically bonded to the second outer layer 14 and to the interliner. Similarly, the first outer layer 12 is metallurgically bonded to the opposite surface of the interliner 16, and hence an excellent strong bond is provided between the first and second outer layers 12 and 14. In this regard, for purposes of the subject application, the term metallurgical bond is intended to denote the bond between metallic materials which is formed at the atomic level, the bond being formed by the interatomic forces between atoms comprising respective materials which are bonded together.

In accordance with one preferred embodiment of the present invention, the laminate 18 is adapted to comprise a composite thermostatic metal laminate. Accordingly, it is contemplated that the first and second outer layers 12 and 14 comprise materials having substantially different characteristics and in particular, preferably have substantially different coefficients of thermal expansion with respect to each other. In this regard, the first and second outer layers 12 and 14 preferably have coefficients of thermal expansion which differ from each other by at least one order of magnitude so that a composite thermostatic metal laminate may be provided having appropriate response characteristics in response to temperature changes. In addition, it is contemplated that the layers 12 and 14 may comprise materials which have a poor bonding affinity with respect to each other and are difficult to bond together utilizing conventional means, although the first and second outer layers may comprise a variety of different materials within the scope of the present invention.

It should be noted that the relative thicknesses of the various layers of material which comprise the composite metal laminate are of significance in the fabrication of a composite laminate having the desired characteristics for its intended use. In addition, the materials utilized are also of significance in this regard. Accordingly, in one example of a preferred embodiment of the present invention, the first outer metallic layer 12 preferably has a thickness comprising approximately 42% of the total thickness of the composite and comprises a material such as the metallic alloy commonly sold under the trade name Invar which comprises by weight approximately between 35½% to 36½% nickel, and the remainder iron. The interliner material 16 preferably has a thickness comprising approximately 8% of the total thickness of the composite and comprises a metallic alloy which comprises by weight approximately between 71% to 73% manganese, 17% to 19% copper, and 9% to 11% nickel. The diffusion layer 20 preferably has a thickness comprising approximately between ½% to 2% of the total thickness of the composite and comprises an intermetallic compound which comprises by weight approximately between 60% to 90% copper and the remainder manganese and the second outer layer 14 has a thickness initially comprising approximately 50% of the thickness of the composite in the FIG. 1 embodiment but comprising approximately between 48% and 49½% of the total thickness of the composite of the FIG. 2 embodiment which is illustrated subsequent to the formation of the diffusion layer 20, which occupies a preselected portion of the volume of the second outer layer 14, while the second outer layer 14 preferably comprises a material such as brass which comprises by weight approximately between 61% to 63% copper and the remainder zinc. In this connection, it should be noted that the diffusion layer 20 is preferably maintained at a minimum thickness relative to the thickness of the composite in order to preclude any significant affect on the resistivity of the final composite laminate material, and it has been found that the above noted range is generally satisfactory in this regard.

In fabricating the above-described example of the composite thermostatic metal laminate, it has been found that it is particularly desirable to provide the first outer layer 12 of Invar having a coefficient of thermal expansion of approximately $.68 \times 10^{-6}$ inch per inch per degree Fahrenheit, while the interliner alloy preferably has a coefficient of thermal expansion of approximately $14.82 \times 10^{-6}$ inch per inch per degree Fahrenheit and the brass second outer layer 14 has a coefficient of thermal expansion of approximately $10.7 \times 10^{-6}$ inch per inch per degree Fahrenheit. Thus, there is a difference in excess of one order of magnitude between the coefficients of thermal expansion of the first and second outer layers 12 and 14 which provides a composite laminate thermostatic material having dseired temperature responsive properties, although it should be noted that other combinations of materials may be employed in forming such a composite laminate. Additional advantageous properties of the above-described example composite laminate include a flexivity of between approximately 144 to $156 \times 10^{-7}$ inch per inch per degree Fahrenheit, a resistivity of approximately 100 ohms per circular mil foot, a modulus of elasticity of approximately 17 to 19 million pounds per square inch and a density of .30 pound per cubic inch.

In fabricating a composite thermostatic metal laminate, such as that illustrated in FIG. 2, the first and second layers 12 and 14 are arranged as shown in FIG. 1 with the intermediate interliner material 16 disposed therebetween, after the materials have been initially rolled to a desired thickness, annealed, and suitably abraded at their mating bonding surfaces as a preparation for the bonding procedure. The respective layers are disposed in abutting relationship as shown in FIG. 1 and are then subjected to a preliminary bonding procedure by single or multiple-pass rolling under predetermined conditions of pressure and temperature by heated rollers which preferably apply a pressure of several hundred thousand pounds per square inch across the layered configuration, causing a reduction in thickness of between approximately 60% to 65% and forming solid-phase green bonds between the respective layers. In this regard, although various thicknesses of material may be initially provided in accordance with the above-described example, the first outer layer 12 may have a thickness of approximately .140 inch, the interliner material 16 may have a thickness of approximately .025 inch, and the second outer layer 14 may have a thickness of approximately .170 inch. After the completion of the above-mentioned procedure and the accompanying reduction in thickness the composite laminate has a total thickness of approximately .120 inch. However, it should be particularly noted that the actual thickness values are merely representative of one example, while a significant factor in this regard comprises the relative thicknesses of the various materials comprising the composite in relation to each other so as to provide a desired thermostatic metal laminate. The composite metal laminate is sintered and annealed in order to improve the green bond at a temperature sufficient to effect the formation of the diffusion layer 20. In this regard, it is desired that the temperature utilized be maintained sufficiently low so as to provide a relatively thin diffusion layer which occupies between approximately ½% to 2% of the total thickness of the laminate as previously explained. The composite laminate is then suitably cooled and cleaned and if desired, may be rolled or otherwise processed to a desired gauge.

In accordance with an important feature of the present invention, the diffusion layer is defined by a preselected portion of the volume occupied by the second preselected layer 14 as the result of the intermingling of copper atoms derived from the second outer layer 14 and manganese atoms derived from the interliner layer 16 such that the diffusion layer 20 comprises an intermetallic compound which occupies a preselected portion of the volume occupied by the second outer layer, and defines the interface between the second outer layer 14 and the interliner 16. It may be noted in this regard that the formation of a diffusion layer is ordinarily quite detrimental in the fabrication of a composite laminate material of this type, which is to have certain desired characteristics since the diffusion layer may, in certain instances, adversely affect the bond between the various layers, as well as adversely affecting various of the electrical and/or thermal properties of the composite material. However, in accordance with the principles of the present invention, the formation of a diffusion layer is utilized advantageously and is precluded from adversely affecting the properties of the composite laminate by maintaining its thickness relative to the overall thickness of the laminate at a preselected low percentage level of between approximately ½% to 2% of the total laminate thickness, by appropriately controlling the time and temperature during the previously described sintering and annealing procedure.

Thus, a novel composite metal laminate particularly adapted for use as a thermostatic metal has been described in which materials having substantially different characteristics and thermal coefficient of expansion as well as a poor bonding affinity with respect to each other, are utilized in forming a composite metal laminate in which the various layers of material are metallurgically bonded to each other in a manner such that an excellent bond is provided, while desired physical characteristics are obtained in the final end product.

Various additional changes and modifications in the above-described embodiment will be readily apparent to those skilled in the art and any of such changes or modifications are deemed to be within the spirit and scope of the present invention as set forth in the appended claims.

What is claimed is:

1. A composite metal laminate material comprising one outer metal layer having a thickness which comprises approximately 42% of the total thickness of said laminate and which comprises an alloy material consisting essentially of by weight approximately between 35½% to 36½% nickel and the balance iron, another outer metal layer having a thickness which comprises between approximately 48% and 49½% of the total thickness of said laminate and which comprises an alloy material consisting essentially of by weight approximately between 61% to 63% copper and the balance zinc, an interliner material which comprises approximately 8% of the total thickness of said laminate and which comprises an alloy material consisting essentially of by weight approximately between 71% to 73% manganese, 17% to 19% copper, and 9% to 11% nickel, and a diffusion layer having a thickness which comprises approximately between ½% and 2% of the total thickness of said laminate, said one outer metal layer being metallurgically bonded to said interliner material which is disposed intermediate said one and said other outer metal layers, said diffusion layer being disposed intermediate said interliner material and said other outer metal layer and being metallurgically bonded to said interliner material and to said other outer metal layer, said outer metal layers having coefficients of thermal expansion which differ from each other by at least one order of magnitude.

2. A composite metal laminate material in accordance with claim 1 wherein said diffusion layer is defined by a preselected portion of the volume occupied by said other outer metal layer and defines the interface between said other outer metal layer and said interliner.

3. A composite metal laminate material in accordance with claim 2 wherein said diffusion layer comprises an intermetallic compound comprising by weight approximately between 60% to 90% copper and the remainder manganese.

4. A composite metal laminate in accordance with claim 3 wherein said diffusion layer is defined by copper derived from said other outer layer and manganese derived from said interliner material.

5. A composite thermostatic metal laminate comprising a first outer layer comprising a first preselected metallic material, a second outer layer comprising a second preselected metallic material, said first and second preselected metallic materials having substantially different coefficients of thermal expansion, an interliner of a third preselected metallic material disposed intermediate said first and second outer layers, said third preselected metallic material having a bonding affinity with said first preselected metallic material and being metallurgically bonded to said first outer layer, and a diffusion layer defined by the interface between said interliner layer and said second outer layer, said diffusion layer being metallurgically bonded to said interliner layer and to said second outer layer, said first preselected metallic material comprising an alloy consisting essentially of by weight approximately between 35½% to 36½% nickel and the balance iron, said second preselected metallic material comprising an alloy consisting essentially of by weight approximately between 61% to 63% copper and the balance zinc, said third preselected material comprising an alloy consisting essentially of by weight approximately between 71% to 73% manganese, 17% to 19% copper, and 9% to 11% nickel, and said diffusion layer comprising an intermetallic compound consisting essentially of by weight approximately between 60% to 90% copper and the balance manganese.

6. A composite thermostatic metal laminate in accordance with claim 5 wherein said diffusion layer occupies a preselected portion of the volume occupied by said second outer layer at the interface between said second outer layer and said interliner layer and is defined by copper derived from said second outer layer and manganese derived from said interliner layer.

7. A composite thermostatic metal laminate in accordance with claim 6 wherein said first outer layer has a thickness which comprises approximately 42% of the total thickness of said laminate, said interliner layer has a thickness which comprises approximately 8% of the total thickness of said laminate, said diffusion layer has a thickness which comprises approximately between ½% and 2% of the total thickness of said laminate, and said second outer layer has a thickness which comprises between approximately 48% and 49½% of the total thickness of said laminate.

8. A composite thermostatic metal laminate in accordance with claim 7 wherein said first preselected material and said second preselected material each have predetermined coefficients of thermal expansion which differ by at least one order of magnitude.

9. A composite thermostatic metal laminate in accordance with claim 8 wherein said first preselected material has a coefficient of thermal expansion of approximately $.68 \times 10^{-6}$ inch per inch per degree Fahrenheit and said second preselected material has a coefficient of thermal expansion of approximately $10.7 \times 10^{-6}$ inch per inch per degree Fahrenheit.

10. A composite thermostatic metal laminate in accordance with claim 7 wherein said laminate has a flexivity of between approximately 144 to $156 \times 10^{-7}$ inch per inch per degree Fahrenheit, a modulus of elasticity of between approximately 17 to 19 million pounds per square inch, a density of approximately .30 pound per cubic inch, and a resistivity of approximately 100 ohms per circular mil foot.

11. A composite thermostatic metal laminate comprising a first outer layer of a metallic material having a relatively low coefficient of thermal expansion comprising an alloy consisting essentially of, by weight, approximately between 35½% to 36½% nickel and the balance iron, a second outer layer of a metallic material having a relatively higher coefficient of thermal expansion comprising an alloy consisting essentially of, by weight, approximately between 61% to 63% copper and the balance zinc, and an intermediate layer of a metallic material comprising an alloy consisting essentially of, by weight, approximately between 71% to 73% manganese, 17% to 19% copper, and 9% to 11% nickel, said intermediate layer being disposed between and metallurgically bonded to said first and second outer layers, said second outer layer having a diffusion layer therein occupying a portion of the volume of said second outer layer and defining the bond interface between said second outer layer and said intermediate layer, said diffusion layer consisting essentially of, by weight, approximately between 60% and 90% copper and the balance manganese and comprising between approximately ½% and 2% of the total thickness of said laminate material.

References Cited

UNITED STATES PATENTS

| 1,700,173 | 1/1929 | Marshall | 29—195.5 |
| 1,799,689 | 4/1931 | Jones | 29—195.5 |
| 2,240,824 | 5/1941 | Alban | 29—195.5 |
| 2,349,577 | 5/1944 | Dean | 29—195.5 |
| 2,470,753 | 5/1949 | Alban | 29—195.5 |
| 3,560,171 | 2/1971 | Ornstein | 29—195.5 |

HYLAND BIZOT, Primary Examiner